(12) United States Patent
Majkrzak

(10) Patent No.: US 6,199,358 B1
(45) Date of Patent: Mar. 13, 2001

(54) REEL TINE ASSEMBLY

(75) Inventor: David S. Majkrzak, West Fargo, ND (US)

(73) Assignee: Crary Company, Fargo, ND (US)

( * ) Notice: Subject to any disclaimer, the term of this patent is extended or adjusted under 35 U.S.C. 154(b) by 0 days.

(21) Appl. No.: 09/330,741

(22) Filed: Jun. 11, 1999

(51) Int. Cl.⁷ .................................................. A01D 80/02
(52) U.S. Cl. ................................................. 56/400; 56/220
(58) Field of Search .......................... 56/14.4, 219, 220, 56/227, 400; 172/389, 391, 612, 643

(56) References Cited

U.S. PATENT DOCUMENTS

| | | | |
|---|---|---|---|
| Re. 24,825 | * 5/1960 | Gustafson | 56/400 |
| 915,476 | 3/1909 | Pomeroy . | |
| 2,024,735 | 12/1935 | Hume et al. | 56/220 |
| 2,909,889 | 10/1959 | Gustafson | 56/400 |
| 2,931,161 | * 4/1960 | Johnston | 56/400 |
| 3,066,470 | 12/1962 | Johnston | 56/400 |
| 3,096,609 | * 7/1963 | Garrett et al. | 56/400 |
| 3,145,520 | 8/1964 | Hume et al. | 56/220 |
| 3,151,436 | * 10/1964 | Johnston | 56/400 |
| 3,157,019 | * 11/1964 | Brackbill | 56/400 |
| 3,192,696 | * 7/1965 | Hurry | 56/400 |
| 3,468,109 | 9/1969 | Reimer | 56/220 |
| 3,550,366 | 12/1970 | Gibson | 56/226 |
| 3,553,950 | 1/1971 | Waser | 56/220 |
| 3,561,206 | * 2/1971 | Fuller et al. | 56/400 |
| 3,613,346 | 10/1971 | Hubbard | 56/400 |
| 3,698,172 | * 10/1972 | Johnston | 56/400 |
| 3,796,030 | * 3/1974 | Neal et al. | 56/220 |
| 3,869,847 | 3/1975 | May | 56/220 |
| 3,983,683 | * 10/1976 | James | 56/364 |
| 4,459,797 | 7/1984 | Gessel et al. | 56/220 |
| 4,520,620 | * 6/1985 | Gessel et al. | 56/400 |
| 4,706,448 | * 11/1987 | Gessel et al. | 56/400 |
| 4,776,115 | 10/1988 | Fox et al. | 56/220 |
| 4,882,899 | 11/1989 | Jasper et al. | 56/220 |
| 4,901,511 | * 2/1990 | Yarmashev et al. | 56/220 |
| 5,271,213 | 12/1993 | von Allwoerdan | 56/400 |
| 5,595,052 | 1/1997 | Jasper et al. | 56/220 |
| 6,079,194 | * 6/2000 | Waldrop | 56/364 |

FOREIGN PATENT DOCUMENTS

| | | | |
|---|---|---|---|
| 1001530 | * 1/1957 | (DE) | 56/400 |
| 1004842 | * 3/1957 | (DE) | 56/400 |

* cited by examiner

*Primary Examiner*—Thomas B. Will
*Assistant Examiner*—Nathan Mammen
(74) *Attorney, Agent, or Firm*—Westman, Champlin & Kelly, P.A.

(57) ABSTRACT

Reel tine assemblies including molded tines that have saddle-like hubs which attach to reel bat tubes using a single screw that extends through the reel bat tubes and threads into a receptacle formed in a post of those tines. The post protrudes into the interior of the reel bat tube and expands as the screw is tightened to provide a secure, stable tine that is held securely with two parts, the tine and the screw.

13 Claims, 4 Drawing Sheets

FIG. 3
FIG. 4
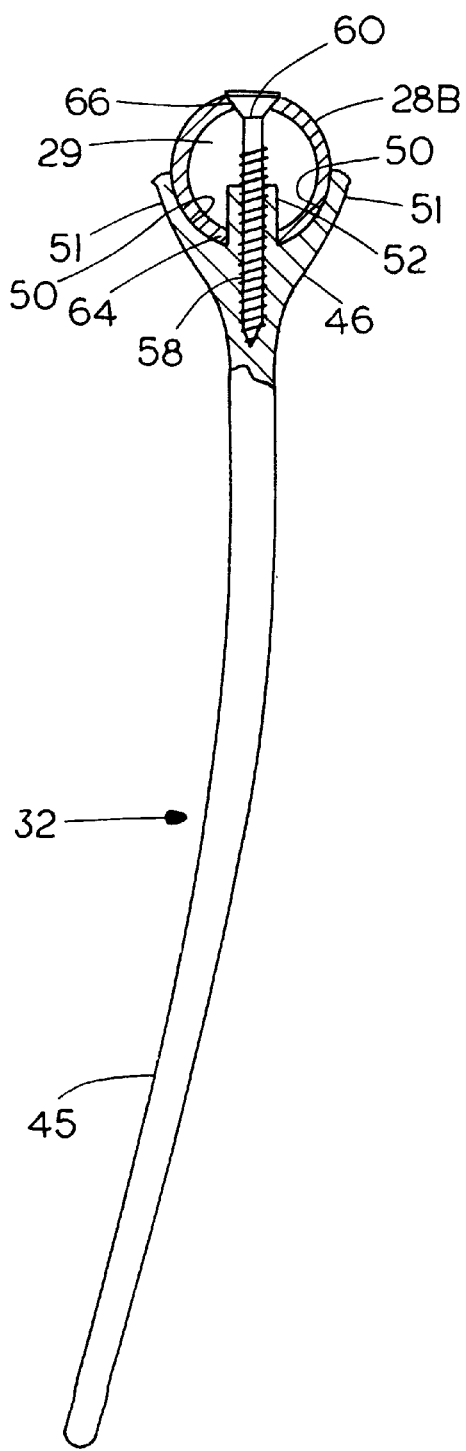
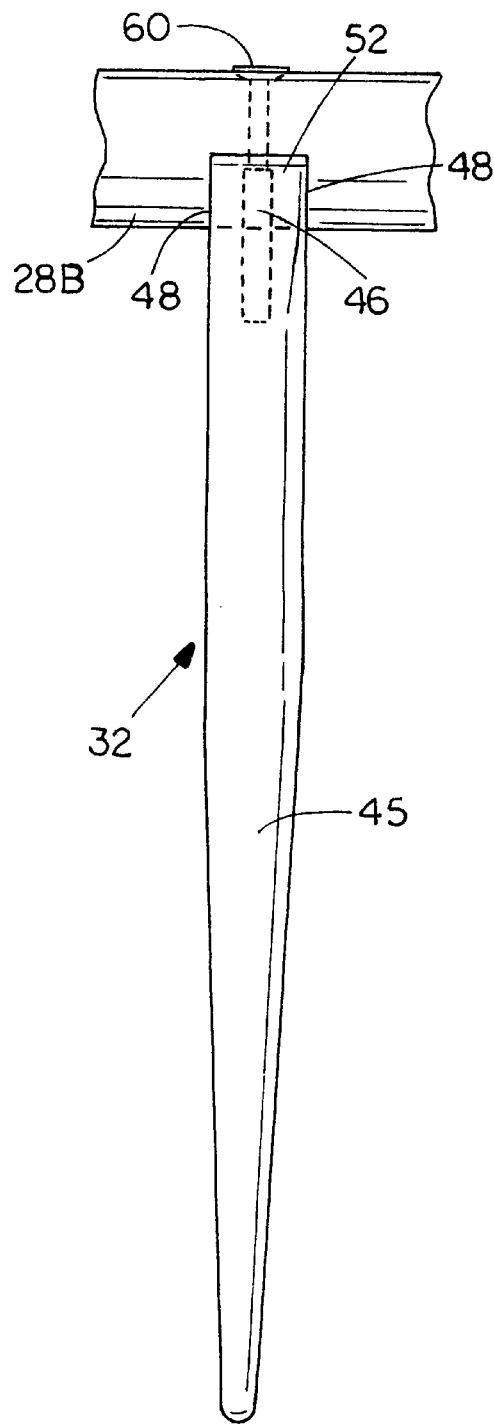

REEL TINE ASSEMBLY

BACKGROUND OF THE INVENTION

The present invention relates to a molded harvester reel finger or tine for mounting on a reel bat tube that is collapsible in length, making the long individual bat tubes easier to service, easier to assemble, easier to ship and stronger. The molded fingers or tines are each mountable on the tubes with a single fastener to hold the reel tine or finger easily and securely for harvesting grain.

Clamp on reel tines or fingers are shown in U.S. Pat. No. 3,613,347. The tine hub forms a hook that goes around a reel tube and extends more than 180° around the tube. The tine or finger is held by snap in lugs.

U.S. Pat. No. 3,066,470 shows a split clamp rake tooth that has a clamp bolt for tightening the clamp onto a tube. A U-shaped saddle bolted to a bat blade is illustrated in U.S. Pat. No. 4,901,511. This also requires a cross bolt on the opposite side of the reel bat from the tine. U.S. Pat. No. 5,595,052 also shows a tine with a split hub to clamp the tine in place. Split hubs are not easy to form and thus are more expensive and installation on the reel bats is time consuming.

In the prior art, various types of reel constructions have been used for harvesting equipment, such as combines, and the bat tubes that are used for forming the reels on such implements are long, making the tubes hard to ship, and difficult to assemble. There are multi-section bats which, while reducing the length, are complex and relatively difficult to assemble. A reel is shown in U.S. Pat. No. 4,459,797. U.S. Pat. No. 3,796,030 shows essentially the same type of construction where reel bats are held together with a member that clamps onto the bats with a bearing journal between them. The formed metal bat sections are joined also by overlapping the ends and bolting them together.

However, it is desirable to have a tubular support bat since tubes are easily obtained and lightweight and also such tubes are easy to use with the tines that attach to the tubes as disclosed herein.

Other molded tines are made with imbedded or molded in place attaching bolts such as that shown in U.S. Pat. No. 3,151,436. A typical bolt-on saddle-shaped member is with a molded end tine is shown in U.S. Pat. No. 3,553,950.

SUMMARY OF THE INVENTION

The present disclosure, in one aspect, shows a tine or finger for a tubular reel bat that is mounted with a single fastener that secures a hub on the finger to the tube. The tine or finger is made in one piece with a hub at one end with a post that also is formed unitarily in place, and when assembled to a tube extends through an opening into the interior of the tube. A single screw or other fastener extends into an opening on the opposite side of the tube and secures the tine post to lock the tine securely to the reel bat tube.

Another aspect of the invention is to provide multi-sectioned support bat tubes so that the bat tubes can be broken down into sections that are shippable by normal commercial shippers, and which can be assembled quite easily to form the reel. The tube sections are joined with shaft sections that also provide for bearing supports at the spiders used on the reel for holding the bats in position.

The tines of the present invention preferably may be molded and are easily used. The hubs are made so that they will tightly engage the tube on which they are mounted to reduce the likelihood of twisting or working loose. The head of the single fastener, as shown a screw, that is utilized can be drawn into a countersunk recess on the opposite side of the tube from the direction of the extension of the tine, so that there are no rough edges to catch straw or the like.

The tine or finger has a hub that has an interior surface that seats on the bat tube and which has a slightly smaller radius than the radius of the tube on which it is mounted so that the hub sides tend to spread as the tine is installed to ensure a secure mounting.

BRIEF DESCRIPTION OF THE DRAWINGS

FIG. 3 is a side view of the tine of the present invention installed on a bat tube with parts broken away;

FIG. 4 is a front view of the time of FIG. 3; and

DETAILED DESCRIPTION OF THE PREFERRED EMBODIMENTS

Figure 1:
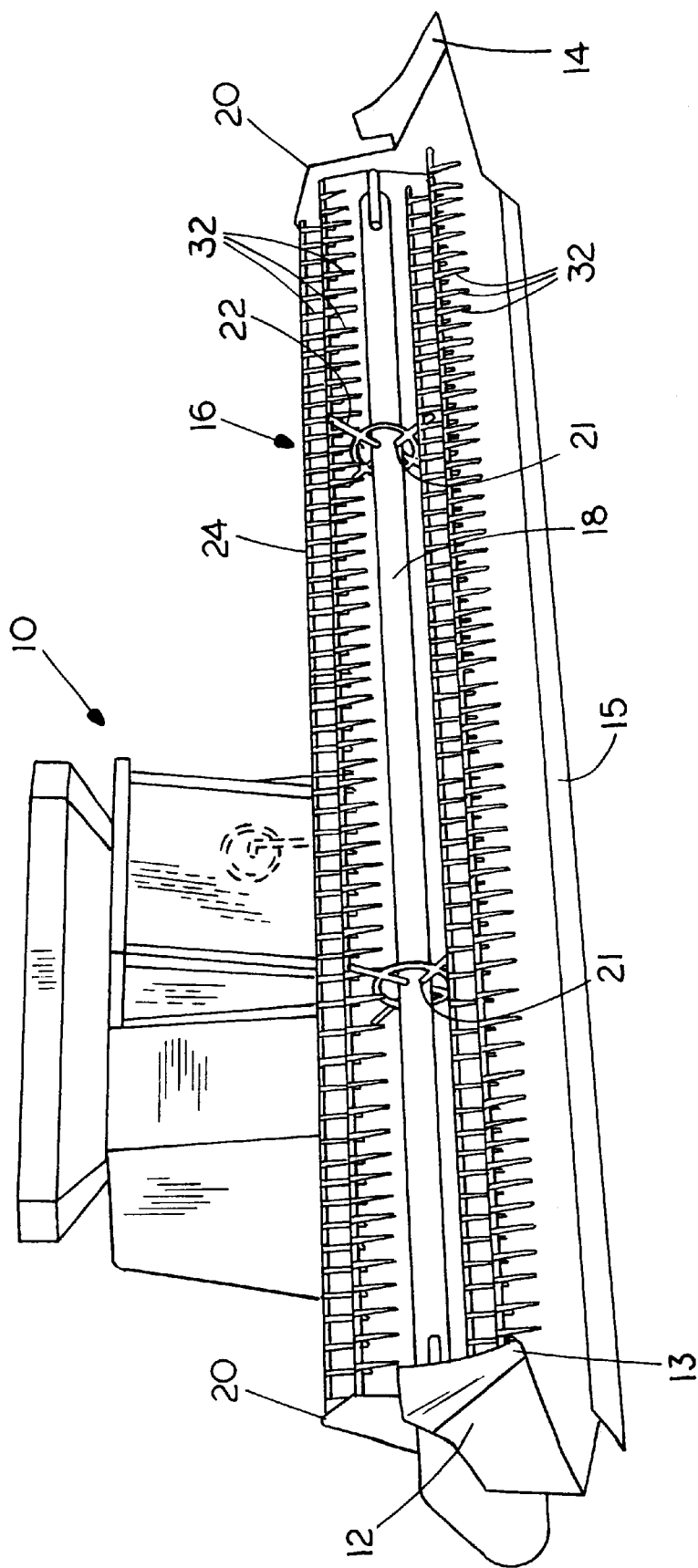
FIG. 1 is a schematic perspective view of a typical combine having a reel utilizing the reel bat tube and fingers of the present invention.

FIG. 1 illustrates a combine 10 that is of conventional design, having a header 12 between divider points 13 and 14, and a cutter bar 15 along the forward edge. A reel assembly indicated generally at 16 as shown is a combined reel that includes an airflow assist, and has a large center support tube 18 on which end plates 20, 20 are mounted. The center support tube 18 also supports a number of individual reel spiders 21 having radial arms indicated at 22 that will support reel bat assemblies 24 at their outer ends. The bat assemblies 24 are rotationally driven as the reel rotates through a drive mechanism at the end plates 20 of the reel, so that the reel bats must turn in bearings used at the outer ends of the spider arms 22 as the reel rotates. In FIG. 1, one of the bats is broken away to show center tube 18 more clearly.

The reel tines or fingers indicated at 32 are made so that they will remain oriented substantially vertically as they move around the axis of the large support tube 18. The drive for these reel bats, and the pivotal operation of the bat tubes through drive arms is well known, and FIG. 1 is provided merely for background to show the environment in which the present invention operates.

Figure 2:
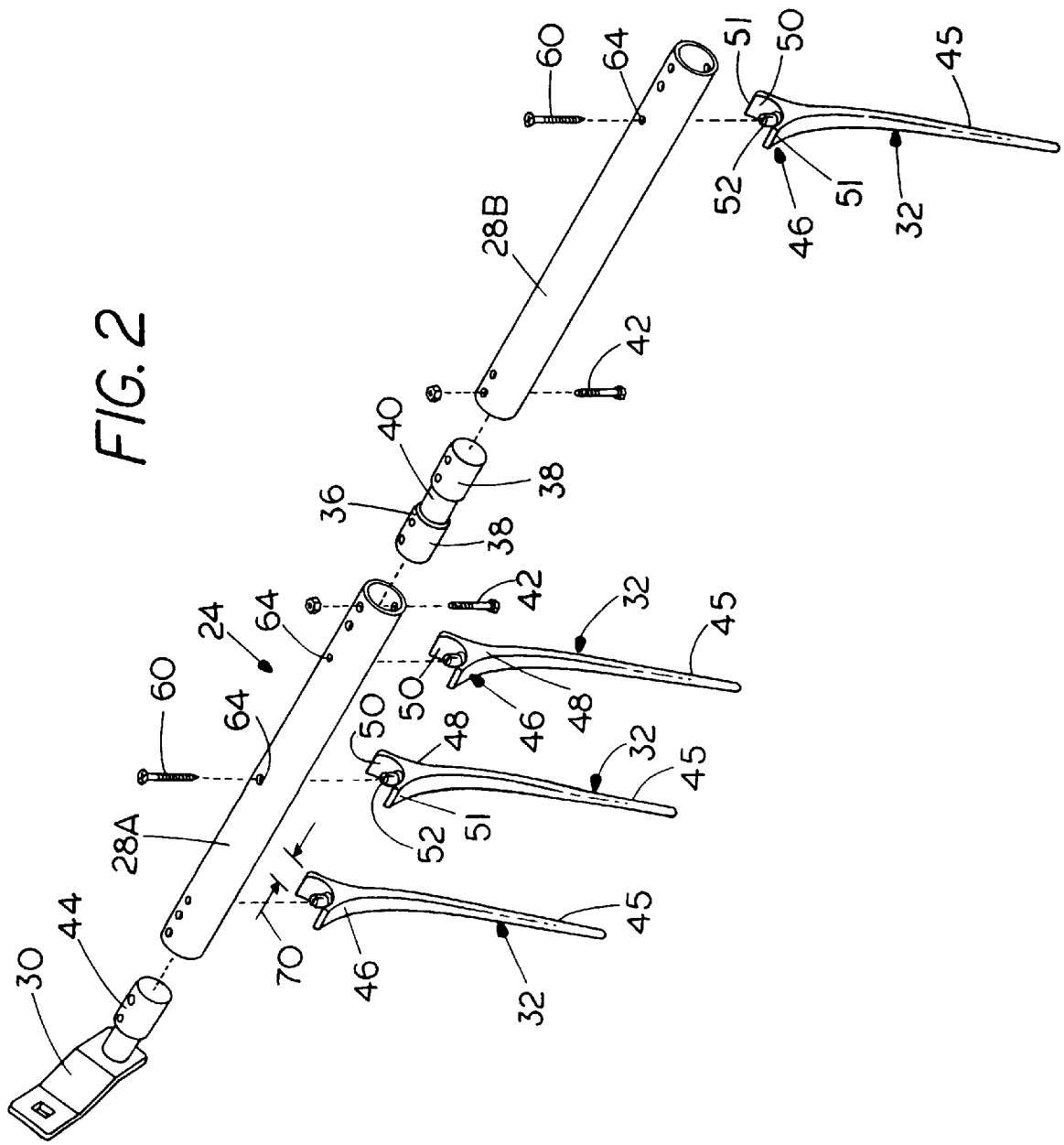
FIG. 2 is a perspective view of two sections of a reel bat tube used in the device of FIG. 1, with tines or fingers of the present invention shown in exploded positions relative to the reel bat tube sections.
Figure 5:
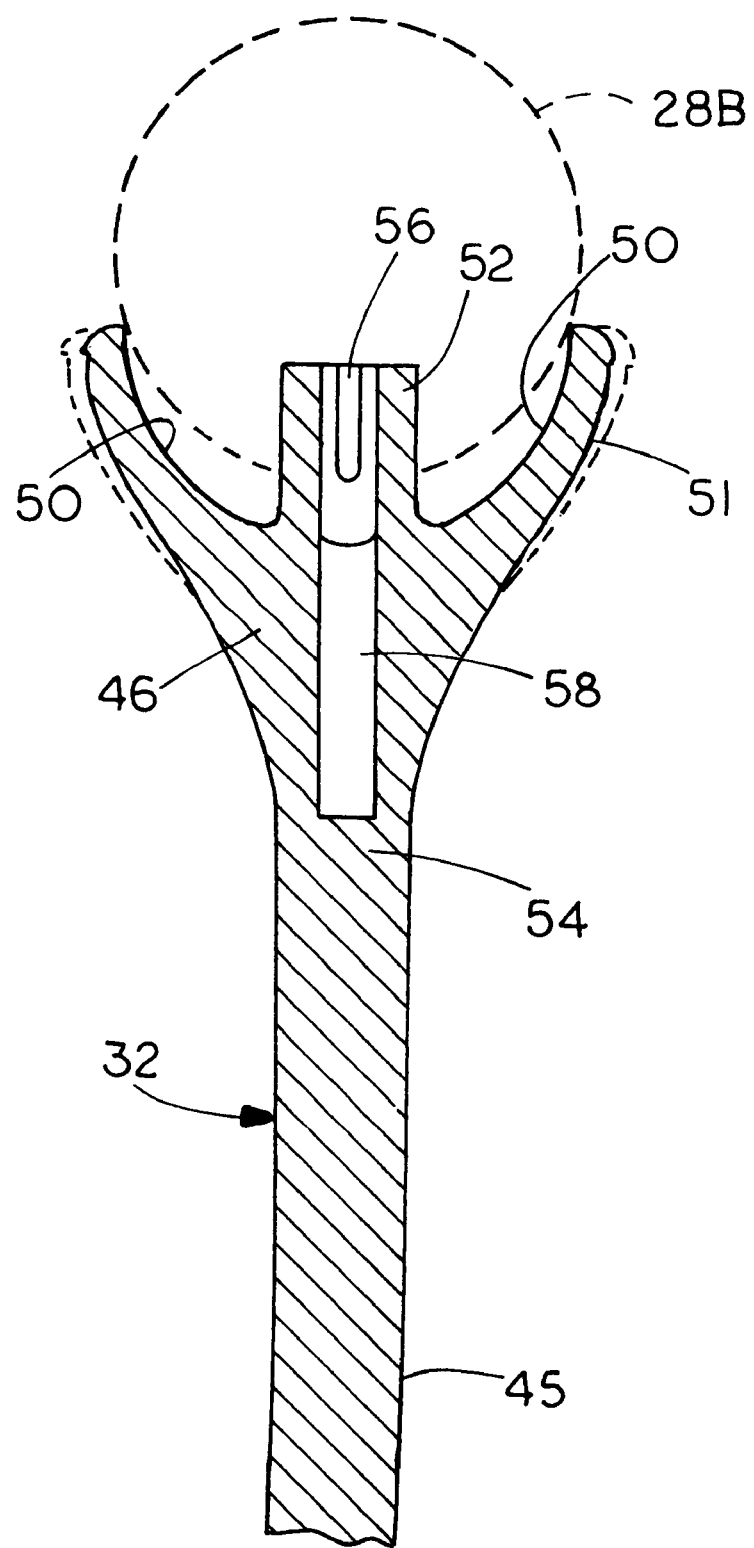
FIG. 5 is an enlarged fragmentary sectional view of the hub portion of a bat illustrating a tube in dotted lines in position for the tine to be mounted on the tube.

Referring to FIG. 2, a partial assembly of a reel bat tube assembly 24 is shown. The reel bat tube is made up of tube sections 28A and 28B, that are identical. The sections 28A and 28B shown are the sections that would extend on either side of a typical spider 21 and the control lever 30 at one end is used for controlling the position of the reel bats relative to the spiders, to keep the tines or fingers 32 properly oriented as the reel rotates. The sections of the reel bat tube shown at 28A and 28B are but two of perhaps four or more sections of the reel bats that would be used in a combine reel. Tube sections 28A and 28B are cut to a desired length, for example, something under eight (8) feet, so that they can be shipped, and when they are assembled, the individual tube sections that are supported on the ends of reel spider arms 22 are joined with a solid junction shaft 36, that has hub ends 38, 38 that are of a diameter that fits closely on the interior of each of the bat tube sections 28A and 28B. The junction shafts 36 have reduced diameter center sections 40 which are used for receiving a bearing or bushing mounted at the outer ends of the arms 22 on the reel spiders 21. The center section 40 can rotate or pivot in bushings on arms 22.

The tube sections 28A and 28B are slid over the hub end 38, and held tightly in place with fasteners such as bolts or cap screws shown at 42, so that a very rigid overall bat made up of multiple lengths of tubes 28A and 28B is formed. The drive lever 30 also has a shaft portion 44 which is of size to fit into the interior of the end bat tube 28A and be held in place with a fastener such as a cap screw 42, as well, although the fasteners for shaft portion 44 are not shown in FIG. 2.

The tines or fingers 32 are made in a unique manner and form an important aspect of the invention. The tines are preferably molded, for example, from a high strength nylon material, so that they can be made relatively cheaply. As shown, the tines have a hub section 46 at an upper end or wall portions. The hub section 46 is formed by arms 51 which form an open-ended saddle that fits partially over the periphery of the tubes 28A and 28B. A narrowed finger portion 45, extends from the hub of each tine. The sides of the hubs 46 are planar along surfaces such as that shown at 48, and the upper or inner surface of the saddle arms 51 are formed into part cylindrical surfaces 50. The part cylindrical surfaces 50 are preferably molded and a molded end fastener receiving post 52 is formed along the central axis 54 of the hub of the tine. The outer end of post 52 is illustrated as being split with a slot 56 along a diametral line. The post 52 and a portion of the hub have an interior bore 58 that is of size selected to provide for retaining a fastener as shown for threading in and retaining a threaded screw shown at 60 in FIG. 2. There is one fastener or screw for each one of the tines.

The bat tubes, for example, the bat tube shown at 28B in FIG. 3, has a bore or opening 64 at the lower side that receives the cylindrical post 52, so that the post 52 protrudes into the interior 29 of the tube 28B. The length of post 52 is greater than the thickness of the tube wall. The surfaces 50 are preferably, but not necessarily made to be of slightly smaller radius than the outside radius of the tube 28B. Arms 51 will spread slightly as the tube is received in the saddle formed so that the arms will provide a clamping force onto the bat tube. Then one fastener, as shown, one screw 60 is placed through an opening 66 on the opposite side of the bat tube, and is held in the interior bore 58 of the port 52 and will spread the slots 56 as the fastener is seated. The screw 60 illustrated will thread into the bore 58 for substantially the full length of the bore. The spreading of the post 52 on the interior of the tube will cause a tight locking action as the disclosed screw 60 pulls the saddle surfaces 50 up tight against the outer surfaces of the tube 28B. The opening 66 in bat tube 28B is countersunk so that the head of the fastener 60 does not protrude from the bat tube to cause snagging of straw or other materials as the reel is operated.

The length of the hub 46 axially along the tube, which is indicated generally by the dimension indicated by double arrows 70 in FIG. 2, can be much greater than that needed for the lower finger portions 45 of the tines, which should be tapered and small so that they operate satisfactorily in various types of grain. Hub length axially can be independent of the axially directed width of the lower portions of the tine and the width indicated at 70 is selected to obtain good stability against sideward loads, and reduce the likelihood that the tines or fingers will work loose.

The mounting of the tine or finger 32 is thus by using a single screw or other fastener, such as a threaded bolt, rivet, expansion plug or other anchor, (only two parts total) that expands into the post. The slit on the post on the interior of the bat tube causes expansion of the post on the interior of the tube so that the finger or tine is held tightly in the hole through which the post extends. The length of the fastener or screw 60 can be controlled, in order to control the flexibility of the tine. The longer fastener or screw will make the tine less flexible, while a shorter fastener or screw permits more flexibility in the junction area where the hub 46 meets the lower finger portion 45 of the tine.

As stated, the saddle or hub surfaces 50 of the tine or finger 32, are made slightly undersized relative to the bat tube diameter to fit very tightly onto the tube. The width 70 that is shown provides side-to-side stability.

The multi-sectioned bat tubes use a standard round tube with a junction shaft inserted at the junction areas, and a very simple bearing support is thus made as well as a very strong junction between tube sections. Tightening of the bolts to hold the junction shaft 36 in place, as well as the shaft 44 at the end arms 30 that control pivoting, deflect the tube walls onto the shaft. The use of a standard sized tube means there is no need for machining the bore.

Cost is reduced, shipping is enhanced because of the multi-sectioned bat tubes, and the tines or fingers 32 can be molded with an open hub at the top and eliminate the need for a separate clamp or a split clamp which makes the tines difficult to install and more expensive. The single screw or fastener provides adequate support for the hub for holding the fingers or tines onto the reel bat tubes.

Although the present invention has been described with reference to preferred embodiments, workers skilled in the art will recognize that changes may be made in form and detail without departing from the spirit and scope of the invention.

What is claimed is:

1. A one piece harvester reel tine for mounting on a support tube comprising a hub formed at a first end of the tine, and an elongated tine finger section internally molded with the hub and extending toward a second end of the tine from the hub, said hub having first and second wall portions that are spaced apart to form an open saddle opening in direction facing away from the tine finger for mounting onto a tube, and a post integrally molded to and on the interior of said hub and having an axis extending away from the tine finger substantially midway between the first and second wall portions and being of size to fit into an opening in the tube on which the tine is to be mounted when the saddle is moved to engage such tube with the wall portions on opposite sides of the tube, said post then extending into such tube and being adapted to receive a fastener extending along the axis of the post for retaining the hub against such tube.

2. The reel tine of claim 1, wherein said hub has an axial width that is parallel to an axis of a tube on which the tine is mounted, the hub selected to be greater than the width of finger section at the second end of the tine.

3. The reel tine of claim 1, wherein said post extends from adjacent inner surfaces of the hub an amount greater than a wall thickness of such tube on which the tine is to be mounted.

4. The reel tine of claim 1, wherein said post has a center opening to receive a fastener extending across such tube from an opposite side of such tube, and the center opening extends inwardly to the interior of the hub and has a length extending toward the second end to provide a recess for receiving a fastener of length to modify the stiffness of the tine at the hub end.

5. The reel tine of claim 1, wherein the fastener is a threaded screw.

6. The reel tine of claim 1, wherein the hub and finger section are integrally molded from one material.

7. The reel tine of claim 3, wherein said inner surfaces of said hub are formed in a radius that is less than a radius of an outer surface of the tube on which the reel tine is to be mounted.

8. The reel tine of claim 1, wherein the tube comprises a reel bat and mounts a plurality of the reel tines to form a reel bat assembly, said reel bat assembly including a plurality of tube sections, and a junction shaft between adjacent tube sections and having end portions fitted into bores of the adjacent tube sections and secured thereto, the junction shaft having a reduced sized bearing journal between the tube sections.

9. The reel bat assembly of claim 8, wherein the end portions of the junction shaft are secured to the respective bat tube with cross fasteners passing through openings in the tube to clamp the tube onto the junction shaft end portions.

10. A harvester reel tine formed as a unitarily molded one piece unit having a saddle portion at a first end, said saddle portion having a surface accessible to engage a support tube and extend partially around such support tube, the reel tine tapering in a direction away from the saddle portion to form a finger section, the saddle portion forming a generally U shape with spaced side walls and a base surface being outwardly open so the side walls engage a support tube and the saddle portion being formed to be smaller in size than the support tube on which the saddle is to be mounted to cause the walls to move outwardly when placed on the tube, and a receptacle for receiving a threaded fastener in the center portions of said saddle portion extending in a direction along an axis of extension of the finger section and which receptacle is between the walls, so that such fastener can be extended through the support tube on which the reel tine is to be mounted along the axis and is secured in said receptacle by threading the fastener into the receptacle.

11. The reel tine of claim 10 further including a post that extends in a direction from the base surface away from the finger section along the axis, the post being of size to fit within and through an aperture in a wall of the support tube on which the tine is to be mounted, the receptacle extending axially along the post.

12. The reel tine of claim 11 and a fastener for insertion into the receptacle in the post and being of size to expand the post to hold the tine onto a support tube.

13. The reel tine of claim 12, wherein said fastener is a threaded screw.

\* \* \* \* \*